(12) United States Patent
Gould et al.

(10) Patent No.: US 8,589,445 B2
(45) Date of Patent: Nov. 19, 2013

(54) CREATING AND DYNAMICALLY MAINTAINING RELATIONSHIPS BETWEEN OPERATIONAL DATA AND OUTPUT DATA

(75) Inventors: Michael Peter Gould, York (GB); Dorian Lawrence Baverstock, Carmarthenshire (GB)

(73) Assignee: Anaplan, Inc., Redwood City, CA (US)

( * ) Notice: Subject to any disclaimer, the term of this patent is extended or adjusted under 35 U.S.C. 154(b) by 1064 days.

(21) Appl. No.: 12/582,828

(22) Filed: Oct. 21, 2009

(65) Prior Publication Data

US 2010/0100571 A1    Apr. 22, 2010

Related U.S. Application Data

(60) Provisional application No. 61/107,038, filed on Oct. 21, 2008.

(51) Int. Cl.
    *G06F 17/30* (2006.01)
(52) U.S. Cl.
    USPC .......................................................... 707/795

(58) Field of Classification Search
    None
    See application file for complete search history.

(56) References Cited

U.S. PATENT DOCUMENTS

| | | | | |
|---|---|---|---|---|
| 7,609,624 B2* | 10/2009 | Alicherry et al. | ............. | 370/228 |
| 7,698,316 B2* | 4/2010 | Song et al. | ..................... | 707/608 |
| 8,151,056 B2* | 4/2012 | Gould | ........................... | 711/129 |
| 8,171,022 B2* | 5/2012 | Johnston | ....................... | 707/733 |
| 8,285,685 B2* | 10/2012 | Prahlad et al. | ................ | 707/665 |
| 2008/0172269 A1* | 7/2008 | Senan et al. | ...................... | 705/7 |

* cited by examiner

*Primary Examiner* — Sherief Badawi
(74) *Attorney, Agent, or Firm* — Coats & Bennett, P.L.L.C.

(57) ABSTRACT

A data-processing apparatus is provided. The data-processing apparatus creates and dynamically maintains relationships between operational data and output data. The data-processing apparatus has first line items for storing operational data. The first line items have operational attributes and at least one treatment attribute. The treatment attribute specifies qualifiers used to create qualified operational data. Impact attributes specify destinations for the qualified operational data in a set of second line items which is arranged to hold the output data. The data-processing apparatus is particularly suited to use as a business planning tool.

16 Claims, 5 Drawing Sheets

CREATING AND DYNAMICALLY MAINTAINING RELATIONSHIPS BETWEEN OPERATIONAL DATA AND OUTPUT DATA

RELATED APPLICATIONS

This application claims priority from the U.S. provisional patent application identified by App. No. 61/107,038, which was filed on 21 Oct. 2008.

TECHNICAL FIELD

The invention relates to a data-processing apparatus for creating and dynamically maintaining relationships between operational data and output data. In particular, but not exclusively, the operational data is grouped in a plurality of separate items which are non-uniform in structure, and the operational data has a complex relationship with the output data. In particular, but not exclusively, the invention finds utility as a business planning tool where the operational data is representative of commercial activity and the output data is representative of commercial performance.

BACKGROUND

It is known for businesses to allocate large amounts of time and money to business planning. This is because business planning is an essential part of informed financial decision-making. For example, business planning is essential for determining and creating future budgets, such as to cost new product development and product launches, or to cost anticipated changes in the price of raw materials or in taxation rules. Business planning is also a key tool in successfully managing business mergers and takeovers. Therefore, a need exists for business planning tools.

At the most basic level, spreadsheets can be used as business planning tools. Spreadsheets are relatively inexpensive to buy and are reasonably easy to use for relatively simple applications. Spreadsheets use basic building blocks, namely cells contained in worksheets and workbooks. Relationships between the cells can be set up to perform calculations on data to produce useful outputs. However, due to the simple structure of spreadsheets, it is difficult to model a relatively complex commercial enterprise with inherent flexibility. This is because, once set up, spreadsheets are difficult to adapt. Complex relationships between cells must be considered before new cells are added. Output data cells must be reconfigured to ensure new input data is taken into account. All of this is time consuming and complex, resulting in inefficient or inaccurate models. Alternatively, spreadsheets are not always maintained due to the time and effort required to make changes, resulting in a spreadsheet model that is not kept up to date with changes to the business.

As a result, more complicated business planning tools have been developed, such as the IBM Cognos 8 Planning tool (Cognos is a registered trade mark owned by Cognos Incorporated of Canada). These are generally based on a Cube/Dimension/Link paradigm. This paradigm has served the industry well for nearly thirty years, and it is possible to build a fully operational model of a complex commercial activity using this paradigm. The planning tool uses a series of cubes to represent operational data with a series of links to move the data to the correct place for output. However, there are two main drawbacks with the Cube/Dimension/Link paradigm, namely that (a) maintenance is difficult and (b) models must be built from scratch every time.

With regard to (a), maintenance is difficult because knowing exactly what impact a particular change might have on other aspects of the model requires specialist knowledge of the product, and a good understanding of the model. Maintenance is best done by the person who built the model in the first place, which is very inflexible. Even adding a single new item may require several links to be manually updated.

With regard to (b), models must be built from scratch because it is difficult to change an existing model. It is not possible to take an existing model built for one customer, and adapt it for another customer. This is because, due to the Cube/Dimension/Link paradigm, it is too hard to know whether the model has been fixed up correctly.

As a result, specialist consultants are employed to develop and maintain models using the Cube/Dimension/Link paradigm. This leads to very high set-up and running costs, and to an inflexible, difficult to use system. Regrettably, this means that small and medium-sized enterprises cannot fully benefit from comprehensive business planning models. In turn, this can impact on their future performance.

Another product, namely Adaptive Planning, has been developed to address these issues (Adaptive Planning is a registered trade mark of Adaptive Planning, Inc. of the United States). The Adaptive Planning product relies on a more basic paradigm and uses a chart of accounts organised onto sheets rather than Cubes/Dimensions/Links. All dependencies between accounts are expressed through formulas. In practice, this is difficult to manage. For example to apply certain calculations to each of several hundred accounts would require many hundreds of additional accounts to be created, and the required calculations to be repeated many times over. Also, many types of commonly used calculations are hard to implement using the basic paradigm. Therefore, custom calculations need to be specified to create "modelled accounts" which do not roll up in the normal way. These modelled accounts must be explicitly linked and require the use of a specialist consultant. Also, to create a dynamic forecasting system it is very complicated to implement the necessary links. A consultant is normally required.

In general, the prior art systems normally require high set-up and maintenance costs, and may lead to an inflexible, difficult to use system.

Therefore, there is a commercial need for a system which addresses the problems associated with the known products and paradigms described above, namely a system which is relatively inexpensive and flexible, and which is quick and easy to set up, use and maintain.

An aim of the invention is to provide such a system. At the very least, it is an aim of the invention to provide a system which attempts to solve one or more of the above-mentioned problems with the prior art.

SUMMARY OF THE INVENTION

According to the present invention there is provided a system as set forth in the appended claims. Other features of the invention will be apparent from the dependent claims, and the description which follows.

According to an aspect of the invention, there is provided a data-processing apparatus for creating and dynamically maintaining relationships between operational data and corresponding output data, the system comprising a microprocessor arranged to cause a computer memory to hold:

a set of first line items arranged to store operational data, wherein at least one line item in the set of first line items has a first operating attribute arranged to specify whether the operational data stored in the at least one line item is primary data or secondary data, wherein primary data is sourced externally from the system and secondary data is derived from operational data stored in at least one other first line item, and if the operational data is secondary data, how the operational data is derived;

a treatment attribute arranged to specify a treatment which is to be applied with respect to the at least one line item, wherein the treatment is arranged to specify at least one qualifier to be used to generate qualified operational data, and the treatment attribute is arranged to specify whether qualified operational data resulting from the application of the treatment is primary data or secondary data, wherein primary data is data sourced externally from the system and secondary data is data derived from operational data or other qualified operational data, and if the qualified operational data is secondary data, how the qualified operational data is derived;

a qualified line item corresponding to each qualifier and which is arranged to store the qualified operational data resulting from the application of the treatment with respect to the at least one line item; and an impact attribute corresponding to each qualified line item and which is arranged to define one or more destinations for the operational data stored in the corresponding qualified line item;

a set of second line items arranged to store output data based on at least the qualified operational data in accordance with each impact attribute.

In this way, a data-processing apparatus is provided which allows a user to:
- add and personalise operational data through use of relatively simple line items,
- customise how output data is derived and presented through use of relatively simple line items, and
- connect the operational data to the output data in a relatively straightforward manner by creating qualified line items and using impact attributes to push data to the relevant line item in the second set of line items.

This ensures that the data-processing apparatus is quick and easy to set-up, use and maintain. Also, any changes in the structure or content of the data-processing apparatus can be straightforwardly and easily handled, without the need to track complex data interrelationships. As a result, the data-processing apparatus can be implemented by a relatively unskilled operator, without resort to specialist consultants. Consequently, implementation costs are reduced, allowing small and medium-sized enterprises to take advantage.

Advantageously, the at least one line item has a second operating attribute arranged to specify the dimensionality of the at least one line item. In this way, automatic handling of dimensionality is achieved by the system.

Also, each qualified line item containing secondary data may have dimensionality which is derived from the dimensionality of the corresponding line item.

In the exemplary embodiment, the data-processing apparatus is arranged to be able to collapse first line items in the first set of line items or at least one corresponding qualified line item by a predetermined level of aggregation so that data can be aggregated into a second line item in the set of second line items. In this way, automatic data aggregation can be performed by the data-processing apparatus, which in turn allows multiple line items to be routed to several destinations very easily. This is because there is no need to know the target and source structures. Instead, a user only need specify the destination.

The predetermined level of aggregation may be arranged to be calculated based on a target versus source comparison between the respective second line item and the respective first line item or each corresponding qualified line item.

At least one line item may have a plurality of treatment attributes specifying a plurality of treatments and the system may be arranged to recognise treatments which share at least one qualifier, to associate those treatments, and to generate a single corresponding qualified line item for the at least one qualifier which is shared. In this way, duplication of data is avoided thus reducing memory and processor usage. Also, this enables combination treatments to be built resulting in a more flexible and user friendly system. Also, treatments need only be defined once. The system automatically recognises and builds compound treatments where available.

The at least one treatment attribute may be also arranged to specify an associated implementation for that treatment, whereby the implementation includes at least the derivation used to derive secondary data or dimensionality of corresponding qualified line items. In this way, changes can be made to the choice of implementation without the need to change the structure. In other words, a treatment can have two or more alternative implementations and an alternative implementation can be substituted without changing the structure. This could be by altering a formula. This results in a more flexible data-processing apparatus which is relatively easy to maintain.

One of the set of first line items may be arranged to have a common treatment attribute. In this way, a change to a treatment attribute results in a corresponding change to the qualified line items of each of the plurality of first line items. This in turn results in a corresponding change to the output data of the second line items impacted upon by the now changed qualified line items. This creates an easy-to-use, flexible and automatic data-processing apparatus.

Each treatment may be arranged to express the derivation of operational data by referencing a qualifier representative of a qualified line item, or a first line item or qualified line item. In this way, changes in the data-processing apparatus can easily ripple through.

In an exemplary embodiment, the set of first line items and the set of second line items are arranged in modules and sub-modules. In this way, line items are more easily grouped and ordered which results in ease of management of the system. The line items included in a sub-module may inherit attributes based on a default setting for that sub-module. In this way, a framework exists for hereditary default attributes to be applied. In other words, default operational attributes, such as primary/secondary data indicators or dimensionality indicators, or default treatment attributes or impact attributes can be set. Newly added line items can therefore be automatically integrated, or at least much more easily integrated, into the data-processing apparatus.

At least one impact attribute corresponding to at least one qualified line item may be set automatically to a default setting determined by the respective qualifier used to generate the at least one qualified line item. In this way, the data-processing apparatus can more easily be maintained because new qualified data is automatically routed to the correct final destination in the set of second line items. This is particularly useful in allowing the creation of standard treatments and associated qualifiers.

The data-processing apparatus may be arranged to present data representing all qualified line items relevant to at least one qualifier, and if the qualified operational data in the respective qualified line items is primary data, is arranged to allow the data to be entered or modified.

At least one impact attribute corresponding to at least one qualified line item may be set by a corresponding one of the line items in the second set of line items. In this way, a more flexible data-processing apparatus is provided.

According to an aspect of the invention there is provided a computer-implemented method for creating and dynamically maintaining relationships between operational data and output data, the computer-implemented method comprising:

creating and arranging a set of first line items to store operational data;

associating at least one line item in the first set of line items with a first operating attribute arranged to specify whether the operational data stored in the at least one line item is primary data or secondary data, and which is arranged to specify how secondary data is derived;

associating the at least one line item with a treatment attribute arranged to specify a treatment which is to be applied with respect to the at least one line item, wherein the treatment is arranged to specify at least one qualifier to be used to generate qualified operational data, and the treatment attribute is arranged to specify whether qualified operational data resulting from the application of the treatment is primary data or secondary data, and which is arranged to specify how the qualified operational data is derived if secondary data;

associating with the at least one line item a qualified line item corresponding to each qualifier;

applying each qualifier to the at least one line item to create qualified operational data and storing that qualified operational data in the respective qualified line item;

associating an impact attribute with each qualified line item, the impact attribute being arranged to define one or more destinations for the operational data stored in the corresponding qualified line item; and creating a set of second line items arranged to store output data and arranged to receive qualified operational data in accordance with each impact attribute to create said output data.

According to another aspect of the invention, there is provided a computer-readable recording medium having recorded thereon instructions for performing the computer-implemented method described immediately above.

According to an aspect of the invention there is provided a data-processing apparatus and computer-implemented method which are arranged to create and dynamically maintain relationships between operational data and output data. The data-processing apparatus and associated method has first line items for storing operational data. The first line items have operational attributes and at least one treatment attribute. The operational attributes specify the form of each first line item. The treatment attribute specifies qualifiers used to create qualified operational data. Impact attributes specify destinations for the qualified operational data in a set of second line items which is arranged to hold the output data.

In one embodiment, the output data is displayed on a screen or other user interface. The output data may be recorded on a computer-readable recording medium for later use.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed below, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE EXEMPLARY EMBODIMENTS

Exemplary embodiments of the invention are now described, by way of example only, with reference to the accompanying drawings.

Figure 1:
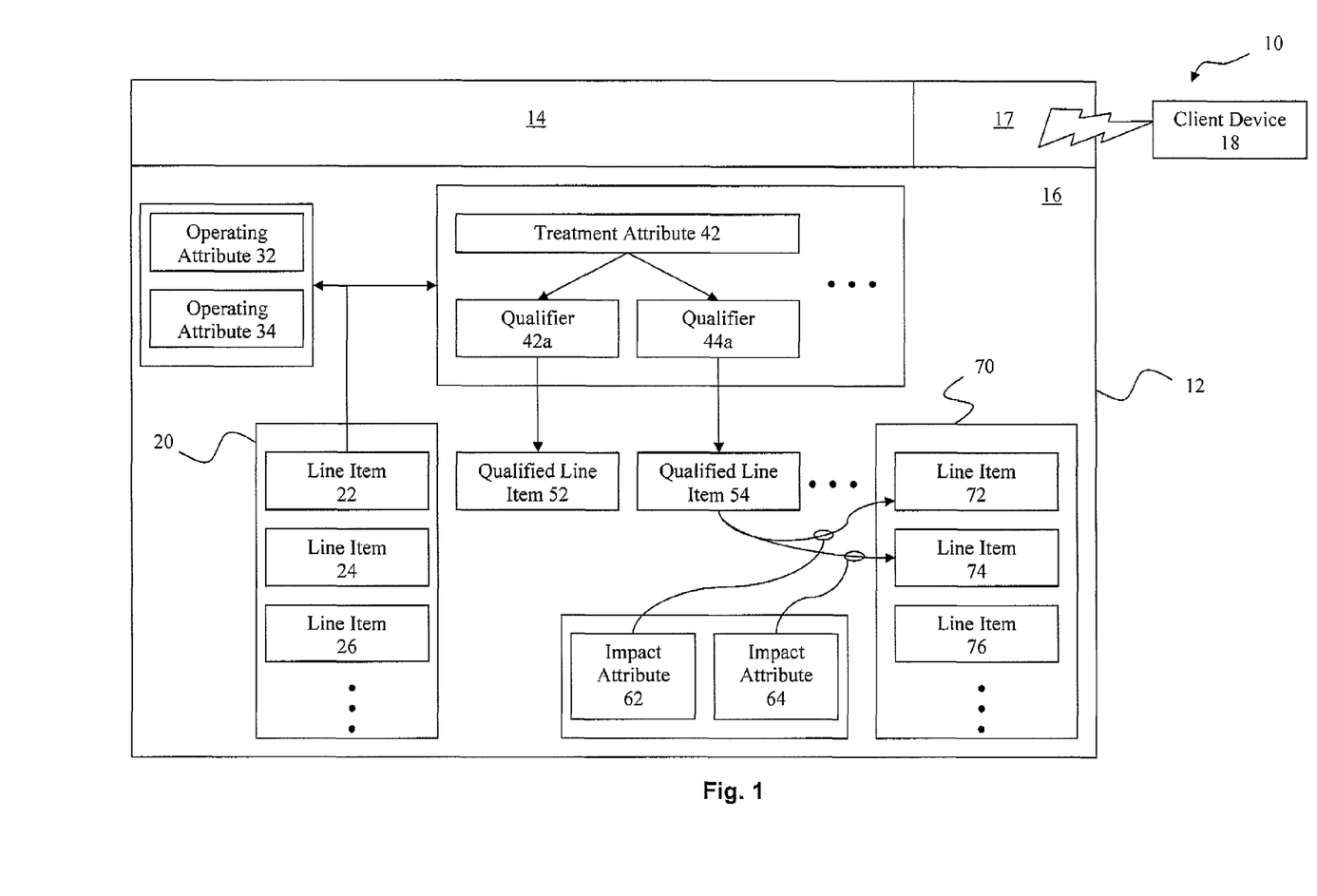
FIG. 1 is a schematic overview of an exemplary system according to a first aspect of the invention.

With reference to FIG. 1, a data-processing apparatus or system 10 is shown which is especially useful for creating and dynamically maintaining relationships between operational data and corresponding output data.

In the exemplary embodiment described, the system 10 is arranged to be executed as a client-server type computer system. Clients wishing to use the system 10 will access a server 12 using a client terminal 18. The system 10 is implemented in Java (RTM) and operates on a Microsoft (RTM) operating system, Mac OS/X operating system or Linux operating system. The system 10 comprises at least one microprocessor 14, computer memory 16 and communications interface 17. The output data is displayed on a computer-screen at the client terminal 18 or other user interface, or is recorded in a computer-readable recording medium for later use.

The system 10 comprises a set of first line items 20 arranged to store operational data in use. In the exemplary embodiment, there are a plurality of first line items 22, 24, 26 in the set.

In this context, a fine item is a structured set of data values representing operational data. In the exemplary embodiment, the operational data represents recognisable activities within a business, that is, things that drive or measure business performance. More specifically in this context, a line item may represent a business driver, a business account or a business measurement. Some examples of line items envisaged by the inventors are listed in Table I:

TABLE I

| Line Item | Type |
| --- | --- |
| Units Sold | Business Driver - Used to model revenue and direct costs |
| Sales Tax Rate | Business Driver - Used to calculate sales tax |
| Headcount | Business Driver - Used to calculate future employees costs |
| Revenue | Business Account - Income |

TABLE I-continued

| Line Item | Type |
| --- | --- |
| Cost of Goods Sold | Business Account - Expenses |
| Trade Creditors | Business Account - Liability |
| Cash at Bank | Business Account - Assets |
| Gross Margin Percentage | Business Measurement - a key ratio |

At least one line item 22 in the set of first line items 20 has a corresponding first operating attribute 32 associated therewith. The first operating attribute 32 is arranged to specify whether the operational data stored in the at least one line item 22 is primary data or secondary data. In this context, primary data is sourced externally from the system 10. An example of primary data is data imported electronically from another system, or from a spreadsheet or other electronic document, or data entered manually by a user (all of which are not shown in the Figures). Secondary data by contrast is data which is derived from other operational data. In the exemplary embodiment, secondary data is derived from operational data stored in at least one other first line item 24, 26. If the first operating attribute 32 specifies that the operational data stored in the at least one line item 22 is secondary data, then the first operating attribute 32 also specifies how the operational data is derived.

In practice, primary data is specified by a NULL entry in the first operating attribute 32. Secondary data is specified by the presence of a formula in the first operating attribute 32 describing how the operational data is calculated from operational data stored in the at least one other line item 24, 26. However, a three-way choice of NULL, primary or secondary is envisaged, wherein NULL means a choice of primary vs. secondary has not yet been specified.

Other optional operating attributes are discussed later in this document.

The at least one line item 22 also has a treatment attribute 42. The treatment attribute 42 is arranged to specify a treatment, or more specifically in the exemplary embodiment, a financial treatment which is to be applied generally with respect to the at least one line item 22.

In this context, a treatment is a set of calculations which are applied to the line items 22, 24, 26 to generate qualified operational data. In the exemplary embodiment, treatments are a pre-configured set of calculations. Examples of financial treatments are "Receipts in Advance", "Accruals", "Prepayments", "Sales Tax", "Debtors", "Creditors", and "Currency Conversion". The qualified operational data are used to generate output data.

In particular, the treatment specifies at least one qualifier 42a, 44a which is to be used to generate the qualified operational data. Examples of qualifiers are "Recognised", "Invoiced Amount, excluding Sales Tax", "Sales Tax Due", "Invoiced Amount, including Sales Tax", "Cash Received", "Cash Paid", "Local Currency Amount" or "Base Currency Amount". The qualifiers 42a, 44a are normally hidden from a user resulting in a cleaner user front-end.

Also, the treatment attribute 42 is arranged to specify whether qualified operational data is primary data or secondary data. Again, as in the case for the operational data, primary data is data sourced externally from the system 10. Again, secondary data is data derived from other operational data. However, with regard to qualified operational data, secondary data is derived from operational data or other qualified operational data. Again, the treatment attribute 42 defines how the qualified operational data is derived by using either a NULL entry for primary data, or a formula for secondary data.

The system 10 is arranged to generate a qualified line item 52, 54 corresponding to each qualifier 42a, 44a. Each qualified line item 52, 54 is arranged to store the qualified operational data resulting from the application of the treatment 42, 44 with respect to the at least one line item 22. Examples of qualified line items are "Revenue: Recognised" and "Revenue: Invoiced Amount, including Sales Tax". In this way, memory allocation for secondary qualified operational data is known in advance based on the at least one line item 22. Also, the formula needed is stored in a single place.

The system 10 is arranged to generate an impact attribute 62, 64 corresponding to each qualified line item 52, 54. Each impact attribute 62, 64 is arranged to define one or more destinations for the operational data stored in the corresponding qualified line item 52, 54.

The system 10 also comprises a set of second line items 70. The second line items 70 are arranged to store output data based on at least the qualified operational data in accordance with each impact attribute 62. The microprocessor is arranged to output the output data to a computer display or other user interface or to record the output data in a computer-readable recording medium. Normally, the output data is transmitted from the server 12 to the client 18.

In this way, the system 10 allows a user to:
- add and personalise operational data through use of relatively simple line items 22, 24,
- customise how output data is derived and presented through use of relatively simple line items 72, 74, and
- connect the operational data to the output data in a relatively straightforward manner by creating qualified line items 52, 54 and using impact attributes 62, 64 to push data to the relevant line item in the second set of line items 70.

Figure 2:
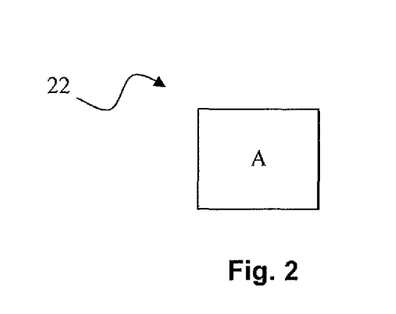
FIG. 2 is a schematic view of an exemplary line item.

Referring to FIG. 2, an exemplary structure of the at least one line item 22 is shown.

As can be seen, the line item 22 represents operational data having a single value A. In practice, this value might represent "Sales Tax Percentage" and be equal to 17.5, depending on the prevailing rate of sales tax. This is an example of a line item used to represent a business driver.

Figure 3:
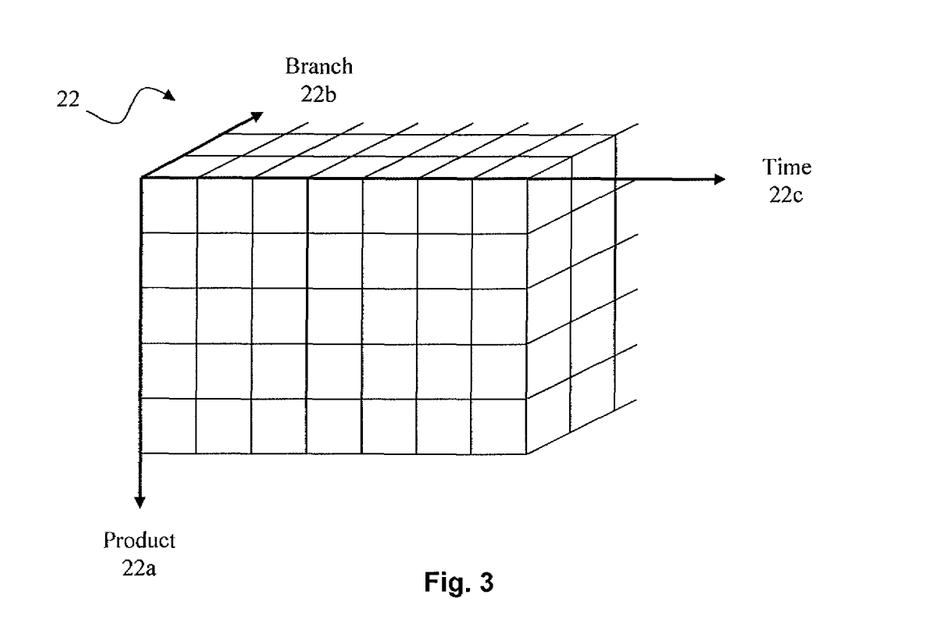
FIG. 3 is a schematic view of another exemplary line item.

FIG. 3 shows a more complex exemplary structure of the at least one line item 22.

Here, the at least one line item 22 represents operational data having multiple values arranged in three dimensions, namely a product dimension 22a, a branch dimension 22b and a time 22c dimension. The values contained in the line item 22 are representative of either a business driver, business account or business measurement. In practice, the values might represent "Number of Units Sold", "Price", or "Discount %" if the operational data is primary data. These would fall under the category of business drivers. Alternatively, the values might represent "Gross Sales", "Discount" or "Revenue" if the operational data is secondary and the formula used for the derivation is stored in the first operating attribute 32. These would fall under the category of business accounts.

As will now be apparent, the system can usefully comprise any number of line items 22, 24, 26, in the set of first line items 20. Each of the line items 22, 24, 26 can be used to represent operational data of a business. Advantageously, the contents of each line item 22, 24, 26 are derivable from other line items 22, 24, 26 in the first set of line items 20 if required. In this way, business activity can be described in a way which is easy to understand, set-up and modify.

In this context, and referring back to FIG. 1, the at least one line item 22 has a second operating attribute 34 arranged to specify the dimensionality of the at least one line item 22.

For example, the second operating attribute 34 might specify that the at least one line item 22 is representative of a single operational data value. In this case, the second operating attribute includes an indicator which specifies what that operational data value represents, such as "Sales Tax Percentage" for example. See Table II for an illustration of the second operating attribute 34 in this context. If this indicator is recognised by the system 10, automatic handling of this data can be performed by the creation of one or more treatment attributes 42, qualifiers 42*a*, qualified line items 52 and impact attributes 62 as necessary.

TABLE II

| Operational Data Represents | No. of Dimensions | Dimension Descriptions | No. of Values per Dimension |
|---|---|---|---|
| Sales Tax Percentage | 0 | NULL | NULL |

Following on, the second operating attribute 34 might specify that the at least one line item 22 is representative of many operational data values organised in a multi-dimensional array. In this case, the second operating attribute 34 includes the indicator which specifies what the operational data values represent, such as "Number of Units Sold", "Price", "Gross Sales", "Discount %", "Discount" or "Revenue". Also, the second operating attribute 34 includes an indicator which specifies the number of dimensions present in the array. Additionally, the second operating attribute 34 includes an indicator which describes what each dimension represents, for example this could be the type of product, sold by each branch over time. Also, the second operating attribute includes an indicator of how large each dimension is in terms of the number of values represented by a particular dimension. For example, there might be one hundred (100) products, sold through a network of fifty (50) branches over a forecasted two-year period (24 months). See Table III for an illustration of several second operating attributes 34 in this context.

Other dimensions are envisaged depending on the operational data to be stored in the line item 22. In the exemplary embodiment, line items 22, 24, 26 may be chosen from a pre-configured but extensible list, and the number of values represented by a particular dimension may be configured by a user. Additionally, the system 10 allows a user to fully customise the line items 22, 24, 26 by configuring the number of dimensions, the type of each dimension (e.g. Product, Branch, Time) and how many values each dimension is arranged to store (e.g. 100, 50, 24). The system 10 is arranged to offer a pre-configured, but extensible, list of dimension types which can be used to configure the line items 22, 24, 26.

TABLE III

| Operational Data Represents | No. of Dimensions | Dimension Descriptions | No. of Values per Dimension |
|---|---|---|---|
| No. of Units Sold | 3 | Product Type | 100 |
| | | Branch | 50 |
| | | Time | 24 |
| Price | 2 | Product Type | 100 |
| | | Time | 24 |
| Gross Sales | 3 | Product Type | 100 |
| | | Branch | 50 |
| | | Time | 24 |
| Discount % | 1 | Branch | 50 |
| Discount | 3 | Product Type | 100 |
| | | Branch | 50 |
| | | Time | 24 |

TABLE III-continued

| Operational Data Represents | No. of Dimensions | Dimension Descriptions | No. of Values per Dimension |
|---|---|---|---|
| Revenue | 3 | Product Type | 100 |
| | | Branch | 50 |
| | | Time | 24 |

Predetermined units for certain of the dimensions 22*a*, 22*b*, 22*c* may also be specified in the system 10, for example time is measured in months and years, such as 2008-10 for October 2008. Also, each line item 22, 24, 26 may include totals and sub-totals of values within each dimension 22*a*, 22*b*, 22*c*. For example, the forecast of total products sold in the first quarter of 2009 for a particular branch, in addition to the monthly sales figures.

In this way, the system 10 is able to create suitably sized line items 22, 24, 26 for storing the respective operational data. A user is able to input as much data as required to suit the business to be modelled, over a suitable time frame. A user is not forced to include more detail than is required, thus avoiding spurious data. All of this results in an easier to use and more efficient system 10.

Also, the system 10 is able to handle automatically line items 22, 24, 26 of varying dimensions and sizes.

Table IV shows an exemplary representation of additional operating attributes in relation to six example line items. In addition to the first operational attribute 32 already described, each line item has third, fourth and fifth operating attributes. Each of the third, fourth and fifth operating attributes are separately introducible and each operating attribute may be implemented differently.

The third operating attribute is referenced as "Applies to" and describes the interrelationship of operational data within the system 10. For example, the line item "No. of Units Sold" has operational data relevant to all three dimensions. Therefore, a NULL value or equivalent is contained in the third operating attribute. However, the line item "Price" has operational data relevant only to one dimension, that is "Product 22*a*", and so this is specified. This information allows the system 10 to know how to handle operations concerning different line items, and means a user need not enter unnecessarily duplicated information.

The fourth operating attribute is referenced as "Summary" and describes how the relevant line item is treated at summary levels. This is typically by summing the details, but differences or some other measure may be used at the summary levels. Also, there are other options which allow further refinement at the summary levels. For example, a potential problem occurs where two summary levels meet at the join of two dimensions. One summary level is given preference and this is specified in the fourth operating attribute. An example here might be where a vertical summation (total revenue) meets a horizontal differential calculation (comparing the relative performance of two branches). In this case, the vertical summations would have preference. This information is stored in the fourth operating attribute.

The fifth operating attribute is referenced as "Balances" and includes information to determine how line items which handle balance information should be handled. Such line items include "Asset" and "Liability" accounts, and also information relating to "Headcount". This operational data is measured at points in time (such as at the end of each month), with movements in and out during the period in between. The fifth operating attribute is particularly optional.

TABLE IV

| Line Item | Primary/Secondary | Applies to | Summary | Balances |
| --- | --- | --- | --- | --- |
| No. of Units Sold | NULL | NULL | Sum | None |
| Price | NULL | Product Type | None | None |
| Gross Sales | No. of Units Sold × Price | NULL | Sum | None |
| Discount % | NULL | Branch | None | None |
| Discount | Gross Sales × Discount % | NULL | Sum | None |
| Revenue | Gross Sales − Discount | NULL | Sum | None |

Each qualified line item 52, 54 also has operational attributes as described above in relation to the at least one line item 22. In particular, each qualified line item 52, 54 which contains secondary data is arranged to share the same dimensionality as the corresponding line item 22 from which the secondary data is derived. This derivation could be either directly from the corresponding line item 22, or indirectly via another qualified line item 52, 54.

Figure 4:
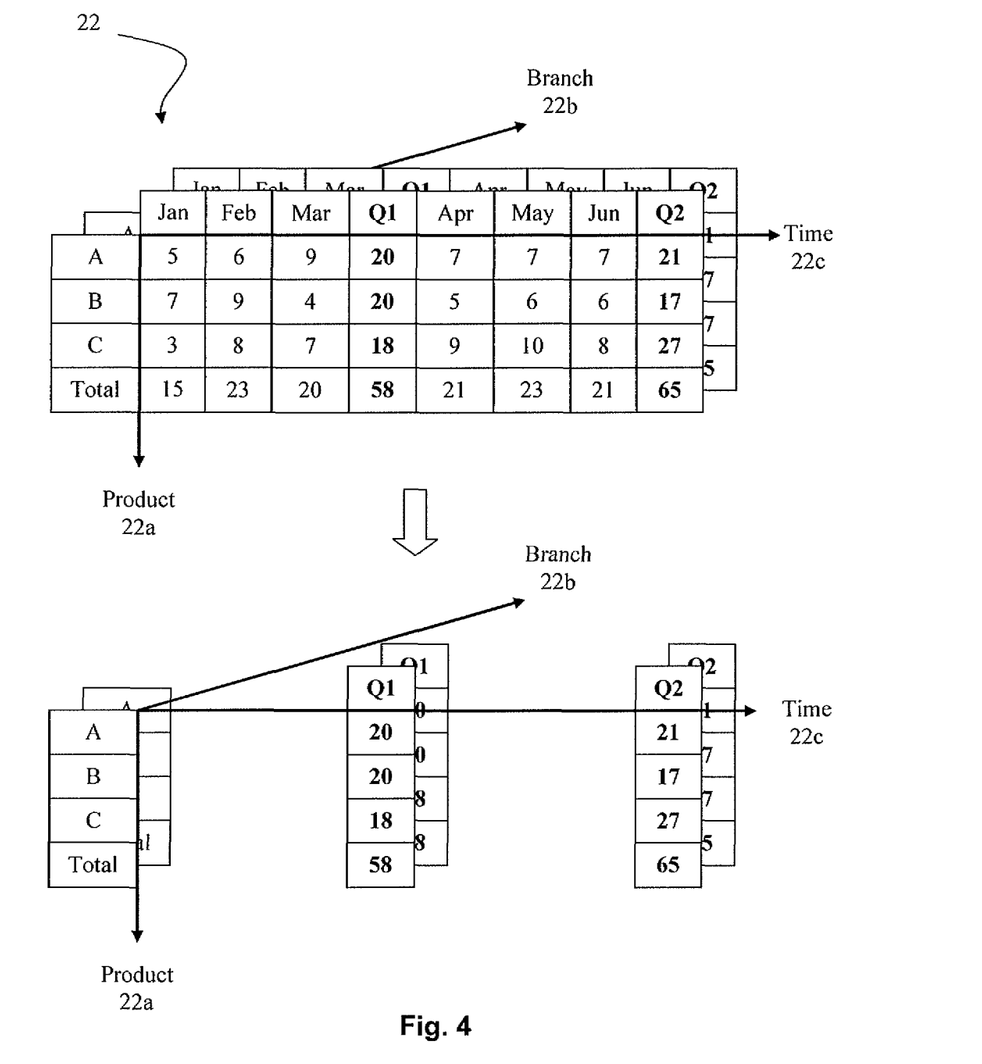
FIG. 4 is a schematic view of a process of collapsing a line item.

Referring to FIG. 4, the system 10 is able to collapse line items 22, 24, 26 in the first set of line items 20 or collapse the qualified line items 52, 54 by a predetermined level of aggregation. An example is given where the line item 22 is collapsed along the time dimension 22c into quarterly data from monthly data. Other forms of aggregation are achievable in practice. This allows at least operational data or qualified operational data to be aggregated into a first line item 22, 24 or second line item 72, 74 having fewer values in one or more dimensions. Or, in other words, the granularity of the data can be decreased.

Likewise, the system 10 is arranged to be able to expand operational data or qualified operational data to fit a first line item 22, 24 or a second line item 72, 74 having more values in one or more dimensions by allocating or some other technique. Or, in other words, the granularity of the data can be increased for compatibility purposes.

In this way, automatic data aggregation can be performed by the system 10, which in turn allows multiple line items to be routed to several destinations very easily. This is because there is no need for a user to know the target and source structures. Instead, a user only need specify the destination.

In the exemplary embodiment, the predetermined level of aggregation is arranged to be calculated based on a target versus source comparison between the respective second line item 72, 74 and the respective first line item 22, 24 or each corresponding qualified line item 52, 54.

Figure 5:
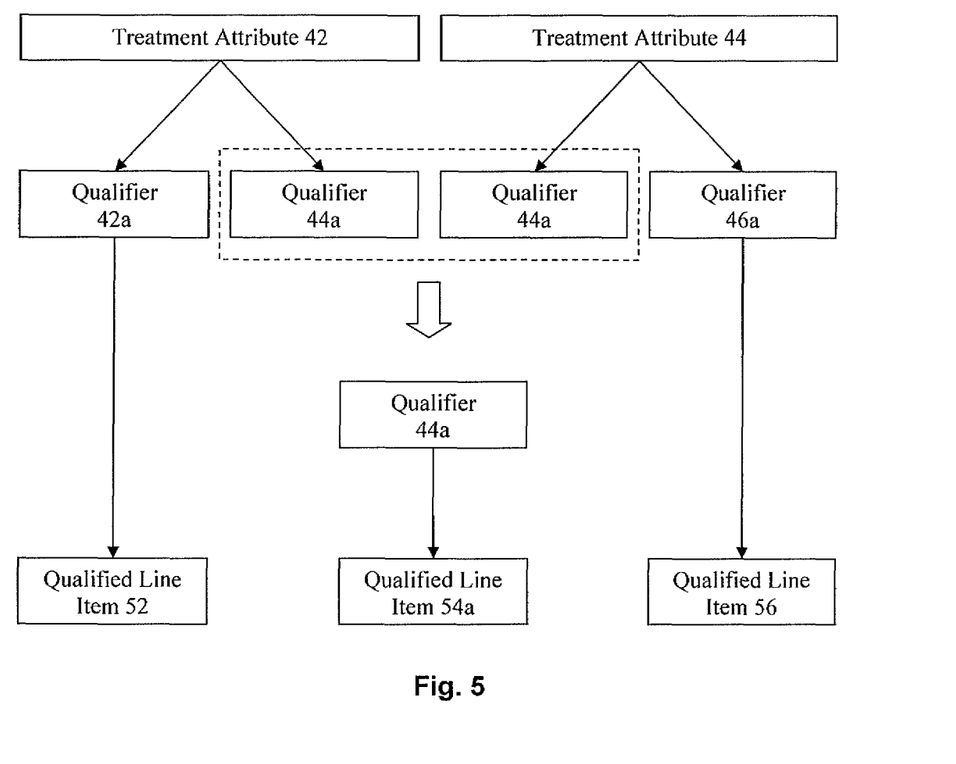
FIG. 5 is a schematic view of process of identifying a common qualifier.

FIG. 5 shows two treatment attributes 42, 44 which are associated with the at least one line item 22.

Here, each treatment 42, 44 shares a common qualifier 44a. In the case where two or more treatments 42, 44 are to be applied to the same line item 22, the system 10 is arranged to recognise those treatments which share at least one qualifier 44a. The system 10 is arranged to associate those treatments 42, 44, and to generate a single corresponding qualified line item 54a holding the qualified operational data resulting from an application of the at least one qualifier 44a which is shared. Also, where at least one other qualifier in one of the now associated treatments references the common qualifier 44a, the system 10 is arranged to automatically associate the qualified operational data in the qualified line item 54a with the at least one other qualifier.

In this way, potential duplication of qualified operational data is avoided thus reducing memory and processor usage. Also, by associating treatments with shared qualifiers, the system 10 can build combination treatments resulting in a more flexible and user friendly system. Also, treatments need only be defined once. The system automatically recognises and builds compound treatments where available.

The system 10 is also arranged to specify an implementation for each treatment. An implementation controls the specific way a treatment is applied, or implemented by the system 10. This control is useful because there are potentially many ways to implement a treatment. An example implementation controls precisely how secondary data is derived. This is useful where "Accrual Data" is being calculated and different flavours of an accrual measurement are desired. Also, another example implementation controls the dimensionality of one or more of any corresponding qualified line items. Implementations are specified within each treatment attribute 42, 44.

In this way, changes can be made to how the system 10 is implemented without the need to change the overall structure. This results in a more flexible system which is relatively easy to maintain.

In the exemplary embodiment, two or more of the first line items 22, 24 are arranged to have a common treatment attribute 42.

In this way, a change to the treatment attribute 42 results in a corresponding change to all of the qualified line items 52, 54 of each of the two or more first line items 22, 24. This in turn results in a corresponding change to the output data of the second line items 70 impacted upon by the now changed qualified line items 52, 54. This creates an easy-to-use, flexible and automatic system.

Also, in the exemplary embodiment, each treatment is arranged to express the derivation of operational data by referencing a qualifier representative of a qualified line item, or a first line item 22, 24 or qualified line item 52, 54. In this way, changes in the system can easily ripple through.

Figure 6:
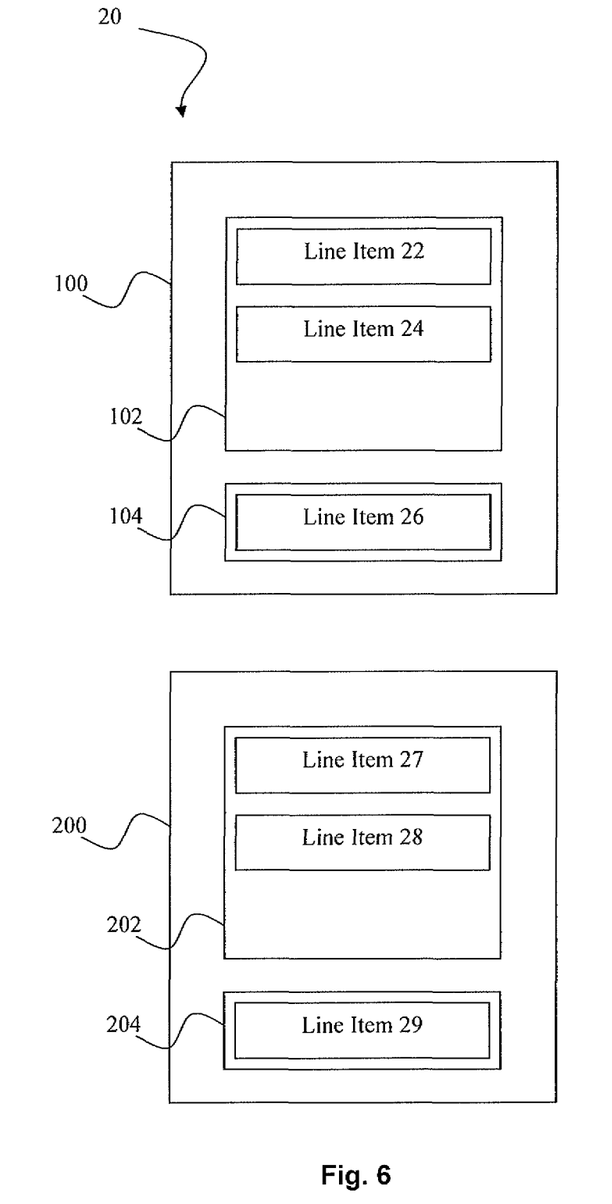
FIG. 6 is a schematic view of a set of first line items arranged into modules and sub-modules.

FIG. 6 shows a detailed arrangement of the set of first line items 20.

In particular, the first line items 22, 24, 26 are arranged within the system 10 broadly in a first module 100. A module in this context is a container for organising operational data which relates to a broad business area or a specific business function. Specific examples include "Sales", "Direct Costs", "Employees", "Overheads" and "Assets".

Each module 100 is broken down into sub-modules which contain the first line items. For example, the first line items 22, 24 are arranged into a first sub-module 102, and the first line item 26 is arranged into a second sub-module 104. If the module 100 represents "Overheads", the first sub-module 102 and the second sub-module 104 might represent "Building Costs", "Travel and Entertainment", or "Admin and Legal Costs" or such like. In the case where the first sub-module 102 represents "Building Costs", there might be line items representing "Rent", "Gas", Electricity", "Insurance" or such like.

Also, there is shown additional first line items 27, 28, 29. These are arranged into a second module 200. Line items 27, 28 are arranged into a second sub-module 202 within the second module 200. Line item 29 is arranged into a second sub-module 204 within the second module.

This arrangement of using modules and sub-modules is also applicable to the set of second line items 80 which are arranged to provide output data from the system 10.

In this way, first and second line items are more easily grouped and ordered which results in ease of management of the system 10.

Also, in the exemplary embodiment, line items included in each sub-module 102, 104 inherit attributes based on a default setting for the respective sub-module 102, 104. In addition, each sub-module 102, 104 may inherit attributes from the module 100.

In this way, a framework exists for hereditary default attributes to be applied. In other words, default operational attributes, such as primary/secondary data indicators or dimensionality indicators, or default treatment attributes or impact attributes can be set. Newly added line items can therefore be automatically integrated, or at least much more easily integrated, into the system 10.

Referring back to FIG. 1, each impact attribute 62 corresponding to each qualified line item 52 may be set automatically to a default setting determined by the respective qualifier used to generate the qualified line item 52. Alternatively, an impact attribute may be manually set by a user. Advantageously, each impact attribute 62 may be derivable from or set by any one of the second line items 70, to create "pull" effect in addition to the "push" effect observed earlier, In this way, a more flexible system 10 is created which a user may easily pull or push data to the relevant output line item, as desired, depending on where or how the user is working the system.

In this way, the system 10 can more easily be maintained because new qualified data is automatically routed to the correct final destination in the set of second line items 70. This is particularly useful in allowing the creation of standard treatments and associated qualifiers.

As will have become clear, the set of second line items 70 can be arranged into modules and sub-modules in the same way as the set of first line items 20. The set of second line items 70 provide output data. In the exemplary embodiment, this output data is presented visually on screen to a user. Preferably, the output data is organised into standard form to show a "Balance Sheet" for "Profit and Loss Statement", or the like. In this way, a user can see how a business will perform based on the operational data input into the set of first line items 20.

Also, the second line items 72, 74 have operational attributes in the same way that the first line items 22, 24 have operational attributes. In addition, it is possible that the second line items 72, 74 also have one or more treatment attributes so that they, in turn, may push information to a set of line items not shown. In this way, a chain-effect can be created with the set of second line items 70 leading through to a further set of second line items.

Also, the system 10 is arranged to present data representing all qualified line items relevant to at least one qualifier, and if the qualified operational data in the respective qualified line items is primary data, is arranged to allow the data to be entered or modified.

The system 10 has been designed as a tool for creating and dynamically maintaining relationships between operational data and corresponding output data. This finds particular application as a business tool, particularly as a business forecasting tool. In the exemplary embodiment described, the system 10 is arranged to be executed as a client-server type computer system. Clients wishing to use the system 10 will access a server 12 using a client terminal 18. The system 10 is implemented in Java (RTM) and operates on a Microsoft (RTM) operating system, Mac OS/X operating system or Linux operating system. The system 10 comprises at least one microprocessor 14, computer memory 16 and communications interface 17. The output data is displayed on a computer-screen at the client terminal 18 or other user interface, or is recorded in a computer-readable recording medium for later use.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data-processing apparatus for creating and dynamically maintaining relationships between operational data and output data, the data-processing apparatus comprising:
a microprocessor arranged to cause a computer memory to hold: a) a set of first line items arranged to store operational data, wherein at least one line item in the set of first line items has: i) a first operating attribute arranged to specify whether the operational data stored in the at least one line item is primary data or secondary data, wherein primary data is sourced externally from the system and secondary data is derived from operational data stored in at least one other first line item, and if the operational data is secondary data, how the operational data is derived; ii) a treatment attribute arranged to specify a treatment which is to be applied with respect to the at least one line item, wherein the treatment is arranged to specify at one qualifier to be used to generate qualified operational data, and the treatment attribute is arranged to specify whether qualified operational data resulting from the application of the treatment is primary data or secondary data, wherein primary data is data sourced externally from the system and secondary data is data derived from operational data or other qualified operational data, and if the qualified operational data is secondary data, how the qualified operational data is derived; iii) a qualified line item corresponding to each qualifier and which is arranged to store the qualified operational data resulting from the application of the treatment with respect to the at least one line item; and iv) an impact attribute corresponding to each qualified line item and which is arranged to define one or more destinations for the operational data stored in the corresponding qualified line item; b) a set of second line items arranged to store output data based on at least the qualified operational data in accordance with each impact attribute.

2. The data-processing apparatus of claim 1, wherein the at least one line item has a second operating attribute arranged to specify the dimensionality of the at least one line item.

3. The data-processing apparatus of claim 2, wherein each qualified line item containing secondary data has dimensionality which is derived from the dimensionality of the corresponding line item.

4. The data-processing apparatus of claim 1, wherein the system is arranged to be able to collapse first line items in the first set of line items or at least one corresponding qualified line item by a predetermined level of aggregation so that data can be aggregated into a second line item in the set of second line items.

5. The data-processing apparatus of claim 4, wherein the predetermined level of aggregation is arranged to be calculated based on a target versus source comparison between the respective second line item and the respective first line item or each corresponding qualified line item.

6. The data-processing apparatus of claim 1, wherein the at least one line item has a plurality of treatment attributes specifying a plurality of treatments and the system is arranged to recognise treatments which share at least one qualifier, to associate those treatments, and to generate a single corresponding qualified line item for the at least one qualifier which is shared.

7. The data-processing apparatus of claim 1, wherein the at least one treatment attribute is also arranged to specify an associated implementation for that treatment, whereby the implementation includes at least the derivation used to derive secondary data or dimensionality of corresponding qualified line items.

8. The data-processing apparatus of claim 1, wherein a plurality of first line items are arranged to have a common treatment attribute.

9. The data-processing apparatus of claim 1, wherein the treatment is arranged to express the derivation of operational data by referencing a qualifier representative of a qualified line item, or a first line item or qualified line item.

10. The data-processing apparatus of claim 1, wherein the set of first line items and the set of second line items are arranged in modules and sub-modules.

11. The data-processing apparatus of claim 10, wherein the line items included in a sub-module inherit attributes based on a default setting for that sub-module.

12. The data-processing apparatus of claim 1, wherein at least one impact attribute corresponding to at least one qualified line item is set automatically to a default setting determined by the respective qualifier used to generate the at least one qualified line item.

13. The data-processing apparatus of claim 1, wherein the data-processing apparatus is arranged to present data representing all qualified line items relevant to at least one qualifier, and if the qualified operational data in the respective qualified line items is primary data, is arranged to allow the data to be entered or modified.

14. The data-processing apparatus of claim 1, wherein at least one impact attribute corresponding to at least one qualified line item is set by a corresponding one of the line items in the second set of line items.

15. A computer-implemented method for creating and dynamically maintaining relationships between operational data and output data, the computer-implemented method comprising:
creating and arranging a set of first line items to store operational data;
associating at least one line item in the first set of line items with a first operating attribute arranged to specify whether the operational data stored in the at least one line item is primary data or secondary data, and which is arranged to specify how secondary data is derived;
associating the at least one line item with a treatment attribute arranged to specify a treatment which is to be applied with respect to the at least one line item, wherein the treatment is arranged to specify at least one qualifier to be used to generate qualified operational data, and the treatment attribute is arranged to specify whether qualified operational data resulting from the application of the treatment is primary data or secondary data, and which is arranged to specify how the qualified operational data is derived if secondary data;
associating with the at least one line item a qualified line item corresponding to each qualifier;
applying each qualifier to the at least one line item to create qualified operational data and storing that qualified operational data in the respective qualified line item;
associating an impact attribute with each qualified line item, the impact attribute being arranged to define one or more destinations for the operational data stored in the corresponding qualified line item; and
creating a set of second line items arranged to store output data and arranged to receive qualified operational data in accordance with each impact attribute to create said output data.

16. A non-transitory computer readable recording medium having recorded thereon instructions for performing a computer-implementable method for creating and dynamically maintaining relationships between operational data and output data, the computer-implementable method comprising: creating and arranging a set of first line items to store operational data; associating at least one line item in the first set of line items with a first operating attribute arranged to specify whether the operational data stored in the at least one line item is primary data or secondary data, and which is arranged to specify how secondary data is derived; associating the at least one line item with a treatment attribute arranged to specify a treatment which is to be applied with respect to the at least one line item, wherein the treatment is arranged to specify at least one qualifier to be used to generate qualified operational data, and the treatment attribute is arranged to specify whether qualified operational data resulting from the application of the treatment is primary data or secondary data, and which is arranged to specify how the qualified operational data is derived if secondary data; associating with the at least one line item a qualified line item corresponding to each qualifier; applying each qualifier to the at least one line item to create qualified operational data and storing that qualified operational data in the respective qualified line item; associating an impact attribute with each qualified line item, the impact attribute being arranged to define one or more destinations for the operational data stored in the corresponding qualified line item; and creating a set of second line items arranged to store output data and arranged to receive qualified operational data in accordance with each impact attribute to create said output data.

* * * * *